Patented Jan. 3, 1933

1,892,772

UNITED STATES PATENT OFFICE

ALPHONS O. JAEGER, OF MOUNT LEBANON, AND LLOYD C. DANIELS, OF CRAFTON, PENNSYLVANIA, ASSIGNORS TO THE SELDEN COMPANY, OF PITTSBURGH, PENNSYLVANIA, A CORPORATION OF DELAWARE

PURIFICATION OF CRUDE AROMATIC COMPOUNDS

No Drawing.   Application filed November 1, 1929. Serial No. 404,202.

This invention relates to the purification of crude and semirefined aromatic compounds and especially such aromatic hydrocarbons as anthracene.

Crude and semirefined anthracene is usually purified by crystallization or washing with various solvents, and it has also been purified by a selective catalytic combustion of the impurities. When a solvent such as furfural is used which dissolves both carbazole and phenanthrene, a satisfactory purification of anthracene may be obtained, but the cost of the solvent is fairly high. In the first place, large amounts of solvent are necessary since the anthracene forms normally only from one-seventh to one-half of the raw material and the percentage recovery of the anthracene is also limited; the process may require a hot filtration which is troublesome because of some slime formation, and both the labor and equipment charges are high. The resulting anthracene, however, is of good purity. When anthracene is to be used as a raw material for the production of anthroquinone by catalytic vapor phase oxidation, the most serious impurity is phenanthrene, as moderate amounts of carbazole can be burned out during the catalytic oxidation without giving rise to any large amounts of undesirable by-products, whereas phenanthrene in large amounts is troublesome and gives some intermediate oxidation products which contaminate part of the anthraquinone obtained.

According to the present invention the disadvantages of the crystallization method with expensive solvents is avoided and relatively cheap solvents can be used with great success. Essentially the process of the present invention consists in fractionally vaporizing the crude anthracene from the molten state at a temperature below the boiling point of the anthracene vapors of solvents falling within the group including unchlorinated aromatic hydrocarbons, substituted and unsubstituted, phenols, amines, alicyclic hydrocarbons and their unchlorinated derivatives, etc. Typical examples of such solvents are benzene, toluene, solvent naphtha, nitrobenzene, aniline, tetraline, decaline, cyclohexane, cyclohexanol, phenol, cresol, technical cresylic acid and the like.

Vapors of the solvents, if desired superheated in the case of the lower boiling products, are passed through or over the heated and usually molten crude anthracene or other aromatic hydrocarbon to be purified, azeotropic mixtures being formed with constituents therein. The result is that the partial pressure of the constituents soluble in the solvent is decreased whereas the partial pressure of those relatively insoluble is correspondingly increased. Accordingly, the constituents which are less soluble in the solvent tend to volatilize, whereas the constituents which are readily soluble tend to remain behind, care, of course, being taken to keep the temperature within limits so that the constituents which are readily soluble in the solvent do not boil.

This selective vaporization in the case of impure anthracene produces on condensation of the vapors and subsequent filtration a product which contains a large proportion of the anthracene and carbazole but from which most of the phenanthrene has been removed, at least in the case of the better grades of anthracene, the reason, of course, being that phenanthrene is quite soluble in the classes of solvents above referred to, whereas anthracene and to a lesser extent carbazole are considerably less soluble. The condensation of the vapors also produces a solution from which anthracene and carbazole crystallize out in good yields and a further amount of the phenanthrene remains in solution in the solvent as in the ordinary solvent purification. Thus, the preferred method of the present invention accomplishes a double purification with the same amount of solvent. First, there is a selective vaporization which leaves a large proportion of the phenanthrene behind and, second, the same solvent on condensation provides an ordinary recrystallization purification, eliminating, however, the labor and equipment consuming step of hot filtration.

It is, of course, possible with higher grades of anthracene and where the final product does not require as high purity to condense out the solids from the carrying vapors at a temperature at which at least part of the vapors of the solvent or mixtures of solvents are still uncondensed. The vapors may then be superheated and then recirculated. This method reduces the loss of the solvent, permits a more or less continuous process when suitable means are taken for continuously discharging the still residue, and also reduces labor, but the product is usually much less pure and in most cases it is preferable to condense all of the vapors from the fractional sublimation and filter as described above. The filtrate is then heated until the solvent distills off, the vapors of the still, with or without superheating, being reused to sublime further quantities of crude anthracene. The still residue which contains phenanthrene and anthracene with some carbazole can be added to the next batch of crude anthracene as it contains nearly as high anthracene content as the original crude.

While it is an advantage that the present invention can be used with any one of the solvents coming under the classes enumerated above, thus permitting in many cases the use of a very cheap solvent, it should be understood that the invention is not limited to using any single solvents alone and vapors of two or more of the solvents enumerated may be used or vapors of one or more of the above solvents may be associated with vapors of chlorinated aromatic compounds such as orthodichlorbenzene and the like or with non-nitrogenous heterocyclic compounds such as furfural. The chlorinated solvents have an effect very similar to the solvents of the present invention, whereas furfural and its homologues exercise a selective solvent action on carbazole and, therefore, decrease the amount of carbazole sublimed over and also remove most of it from the anthracene during the filtration of the condensed vapors. It should be understood that the use of chlorinated organic compounds is not claimed except in combination with the solvents of the present application, but forms the subject matter of our co-pending application Serial No. 397,773 filed October 5, 1929. It should also be understood that the use of furfural vapors is not claimed except in combination with the solvent vapors of the present invention, but forms the subject matter of our co-pending application Serial No. 397,738 filed October 5, 1929.

Another modification consists in adding a solvent for carbazole, such as furfural or pyridine, to the condensed vapors during crystallization in order to obtain a purer anthracene; in fact any known solvent method may be used at this stage in order to aid in the purification.

As the purified product consists primarily of anthracene and carbazole, amounting in most cases to 85 to 92% of the purified product, it may be subjected to suitable treatment for the recovery of carbazole, for example heating with caustic alkali and distilling off the anthracene, heating with caustic alkali and removing the anthracene by solvents, recrystallizing from furfural or pyridine or other carbazole solvent and other methods. For the oxidation of anthracene in the vapor phase to anthraquinone using efficient stabilized catalysts, carbazole is ordinarily not objectionable in moderate quantities and the purified anthracene may, therefore, be directly used for this purpose. The recovery of carbazole will depend, of course, largely on the market for carbazole, but it should be understood that the present invention includes recovery of carbazole wherever it is economically desirable. Phenanthrene may be recovered from the crude anthracene still residue by the ordinary means wherever there is a demand for it.

The present invention may be used with crude anthracenes of various grades, or may be used with semi-purified anthracenes such as those which have been subjected to solvent treatment or to catalytic purification by selective combustion of impurities. Of course, where anthracenes of higher purity are used as a raw material the resulting purified products are also of higher grade.

It is desirable in some cases to pass superheated or saturated vapors of the solvent through molten crude anthracene, but the invention is not limited thereto and it is also possible to mix the solvent with the crude anthracene and heat them together until the solvent boils off. This process, while feasible, does not superheat the vapors and except with very high boiling solvents results in a less efficient fractional sublimation than the preferred embodiment, but is, of course, included in the scope of the application where the peculiar nature of the crude makes it desirable.

The invention has been described in connection with the purification of crude anthracene, in which process it finds perhaps its most important commercial application. It should be understood, however, that what has been said is equally applicable to other aromatic hydrocarbons such as crude acenaphthene and other solid aromatic hydrocarbons, etc. The invention may also be used in the separation of carbazole from phenanthrene where a carbazole-phenanthrene mixture is obtained, for example from recrystallization processes using furfural or pyridine as solvents. When used on crude phenanthrene the carbazole comes over in high percentage leaving most of the phenanthrene behind.

The fractional vaporization may be effected in a simple batch process as described above, or the molten crude aromatic compound may be either sprayed into ascending vapors of the subliming solvent or permitted to flow countercurrent thereto, for example in a baffle tower. These processes require a more complicated equipment, but present the advantage that the process may be made continuous with respect to the crude product, the still residue being continuously drawn off as fresh material is sprayed or flows down the tower. The advantages of continuous processes are thereby made available, and, as has been described above, the second step in the process, namely the condensation of the purified product, may also be made continuous with regard to the carrier vapor by condensing out at a temperature above the boiling point of the vapor. It should be understood that the process may be made continuous as to either or both steps.

The invention will be described in greater detail in connection with the following specific examples which are merely representative illustrations and which are in no sense intended to limit the invention to the exact details therein set forth.

*Example 1*

A crude anthracene of 29% purity is melted in a still, the temperature being maintained between 280 and 320° C. Vapors of solvent naphtha, if desired superheated to the temperature of the molten anthracene, are passed through it, causing vaporization of the anthracene and the major part of the carbazol, but only of small amounts of phenanthrene, and are then led through a condenser, and the condensate cooled to atmospheric temperatures and filtered. The cake from the filtration contains 60-62% anthracene, the recovery being about 63%; of the remainder, about 26% is carbazole and the rest being mainly phenanthrene. The filtrate is distilled and the remaining residue contains 23% anthracene, the recovery being about 26%, so that the total anthracene recovered is about 92%. As the residue has almost as much anthracene as the original crude, it is added to a fresh batch of crude and the cycle repeated. Vapors of the filtrate are recirculated directly through the crude anthracene still. The residue in the crude anthracene still contains most of the phenanthrene and a number of tarry constituents such as pyrene, retene, dead oils, etc. If desired, the phenanthrene may be recovered from this residue, using the ordinary methods.

*Example 2*

Crude anthracene as described in Example 1 is heated to a temperature between 290 and 320° C. Vapors of cresylic acid, if desired superheated to the temperature of the molten anthracene, are then passed through the still taking up anthracene and carbazol, together with small amounts of phenanthrene, and then through a condenser, and the condensate cooled and filtered. Vaporization continues as long as crystals deposit on cooling. When crystals no longer deposit on cooling the condensate, a further volume of condensate is collected separately, being half as much as the first. If it is desired to get a material from which phenanthrene can be recovered by crystallization, the distillation may be continued at higher temperature, from 330 to 360° C., producing a third fraction. The filter cake from the first fraction is pressed as dry as possible and freed from residual solvent by any suitable means, such as drying, preferably under reduced pressure, or washing with alkali. From 78 to 84% of the anthracene content of the crude material is recovered in the filter cake of the first fraction, the percentage of anthracene being as high as 75% in some cases.

The filtrate from the first fraction and the second fraction is distilled until from 45-60% of the solvent is distilled off. Thereupon the still content is permitted to cool and is filtered. The second filter cake is filtered in the same manner as the filter cake from the first fraction and the filtrate is distilled with steam or the solvent removed by washing with alkali, producing a still residue. From 12 to 16% of the anthracene values in the original crude are recovered in the filter cake from the second fraction, and the still residue has 50% anthracene which, if desired, can be reworked if added to the next batch or can be crystallized with any of the ordinary solvents, permitting satisfactory recovery of carbazole as well as purified anthracene.

*Example 3*

Crude anthracene as described in Example 1 is subjected to vapor distillation with aniline, the procedure being the same as in the foregoing example, except that where aniline is removed by washing an acid is used instead of an alkali. The yields and recoveries are substantially the same as with cresylic acid, but the second fraction contains a larger amount of carbazole which can be divided so as to produce a mixture of solids containing 30-35% of carbazole, which can be recovered by means of alkali, the carbazole recovered amounting to from ⅓ to ½ of the carbazole in the original crude, the recovered carbazole being from 80-85% pure.

*Example 4*

The residue from a solvent purification of crude anthracene containing about 35% carbazole is treated as in Example 1, using solvent naphtha as a carrier vapor. The product obtained contains from 55-60% carbazole, from which purified carbazole can be readily obtained by the usual methods.

In the specification and claims the terms "subliming" and "sublimation" are used in their broad technical sense to define the passage of material into the vapor phase at temperatures below its boiling point at the pressures used, and it is understood that these terms will have no other meaning.

What is claimed as new is:

1. A method of purifying solid crude aromatic compounds, which comprises fractionally vaporizing the product in a carrier gas stream containing vapors of at least one compound included within the group consisting of unchlorinated aromatic hydrocarbons, phenols, amines, alicyclic hydrocarbons and their unchlorinated derivatives the carrier gas stream containing the vapors being caused to contact with the crude aromatic compound to be purified.

2. A method of purifying solid crude aromatic hydrocarbons, which comprises fractionally vaporizing the product in a carrier gas stream containing vapors of at least one compound included within the group consisting of unchlorinated aromatic hydrocarbons, phenols, amines, alicyclic hydrocarbons and their unchlorinated derivatives the carrier gas stream containing the vapors being caused to contact with the crude aromatic compound to be purified.

3. A method of purifying crude anthracene, which comprises fractionally vaporizing the product in a carrier gas stream containing vapors of at least one compound included within the group consisting of unchlorinated aromatic hydrocarbons, phenols, amines, alicyclic hydrocarbons and their unchlorinated derivatives the carrier gas stream containing the vapors being caused to contact with the crude anthracene to be purified.

4. A method of purifying solid crude aromatic compounds, which comprises fractionally vaporizing the product in a carrier gas stream containing vapors of at least one compound included in the group consisting of aromatic hydrocarbons and their unchlorinated derivatives, aromatic amines, phenols the carrier gas stream containing the vapors being caused to contact with the crude aromatic compound to be purified.

5. A method of purifying solid crude aromatic hydrocarbons, which comprises fractionally vaporizing the product in a carrier gas stream containing vapors of at least one compound included in the group consisting of aromatic hydrocarbons and their unchlorinated derivatives, aromatic amines, phenols the carrier gas stream containing the vapors being caused to contact with the crude aromatic compound to be purified.

6. A method of purifying crude anthracene, which comprises fractionally vaporizing the product in a carrier gas stream containing vapors of at least one compound included in the group consisting of aromatic hydrocarbons and their unchlorinated derivatives, aromatic amines, phenols the carrier gas stream containing the vapors being caused to contact with the crude anthracene to be purified.

7. A method of purifying solid crude aromatic compounds, which comprises fractionally vaporizing the product in a carrier gas stream containing vapors of aromatic hydrocarbons of the benzene series the carrier gas stream containing the hydrocarbon vapors being caused to contact with the crude aromatic compound to effect vaporization.

8. A method of purifying solid crude aromatic hydrocarbons, which comprises fractionally vaporizing the product in a carrier gas stream containing vapors of aromatic hydrocarbons of the benzene series the carrier gas stream containing the hydrocarbon vapors being caused to contact with the crude aromatic compound to effect vaporization.

9. A method of purifying crude anthracene, which comprises fractionally vaporizing the product in a carrier gas stream containing vapors of aromatic hydrocarbons of the benzene series the carrier gas stream containing the hydrocarbon vapors being caused to contact with the crude anthracene to effect vaporization.

10. A method according to claim 1, in which the vapors of the vaporization are condensed at a temperature below the boiling point of the solvent vapors and the condensate filtered cold whereby a further solvent purification is effected in addition to the purification resulting from the step of fractional vaporization.

11. A method according to claim 2, in which the vapors of the vaporization are condensed at a temperature below the boiling point of the solvent vapors and the condensate filtered cold whereby a further solvent purification is effected in addition to the purification resulting from the step of fractional vaporization.

12. A method according to claim 3, in which the vapors of the vaporization are condensed at a temperature below the boiling point of the solvent vapors and the condensate filtered cold whereby a further solvent purification is effected in addition to the purification resulting from the step of fractional vaporization.

Signed at Pittsburgh, Pennsylvania this 26th day of October, 1929.

ALPHONS O. JAEGER.
LLOYD C. DANIELS.